Patented Mar. 3, 1936

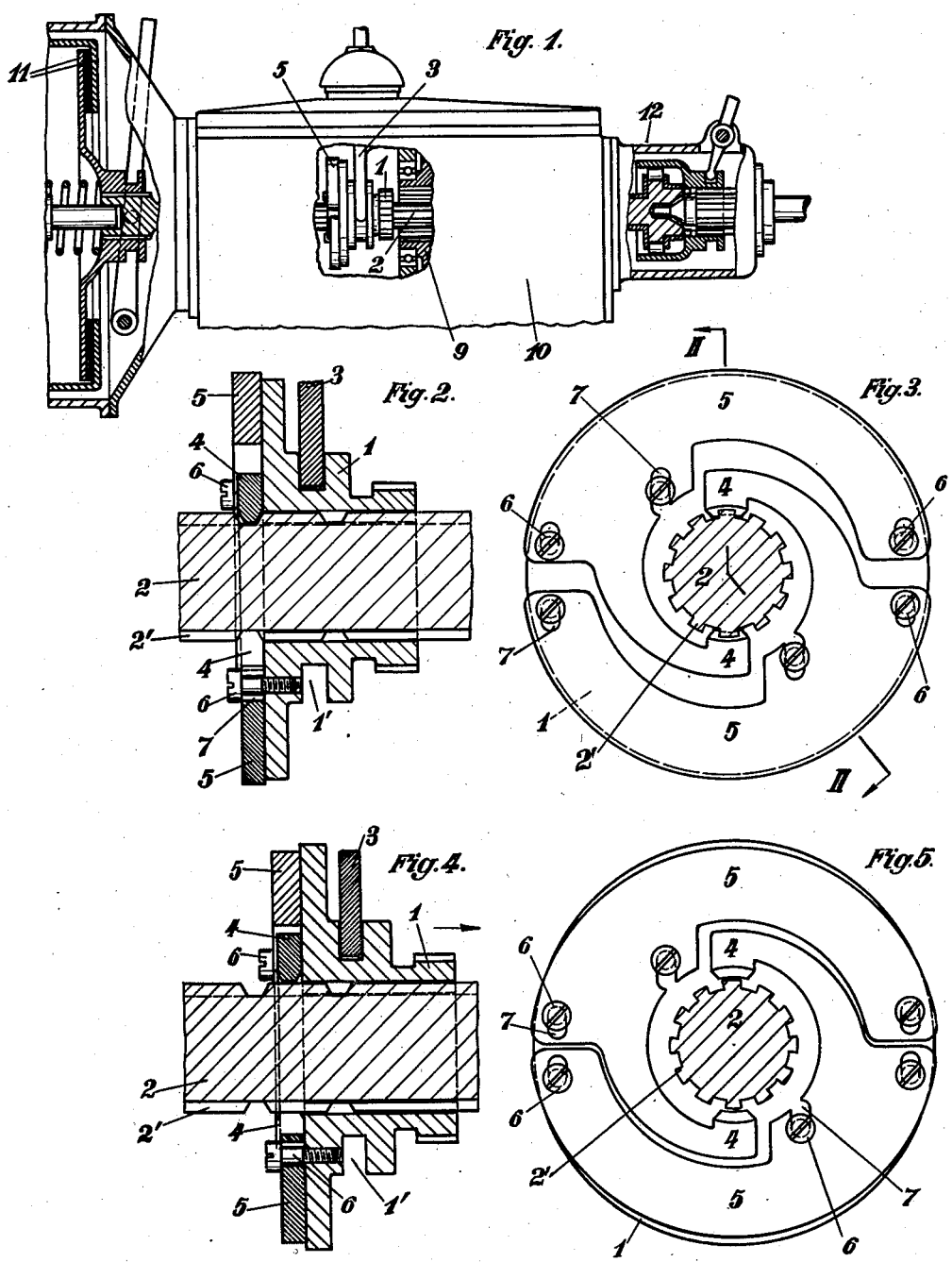

2,032,587

UNITED STATES PATENT OFFICE 2,032,587

CHANGE SPEED GEAR

Albert Maier, Friedrichshafen, Germany, assignor to Zahnradfabrik Friedrichshafen Aktiengesellschaft, Friedrichshafen, Germany Application July 31, 1934, Serial No. 737,740
In Germany August 7, 1933

2 Claims. (Cl. 192—103)

My invention relates to improvements in change speed gears, as for instance such used in motor vehicles, in which apart from the usual main clutch for connecting the change speed gear to the engine shaft behind the change speed gear an auxiliary clutch is provided which may be a free wheel clutch.

The object of the invention is to so construct slidable control parts, such as gears, coupling halves or other parts arranged in the change speed gear which are shifted for engagement and for disengagement, that such shifting takes place in a most silent manner and without any shocks.

Another object of the invention is to obtain a very simple and effective construction.

In accordance with my invention these objects will be attained by providing the control parts to be shifted with special locking members which are influenced by centrifugal force in such a manner that the control parts while revolving together with their shaft are normally locked against longitudinal displacement, but when the change speed gear is declutched from the motor and from the driven shaft leading to the vehicle wheels the said locking members will come out of action, because of the decrease in the number of revolutions of the parts of the change speed gear to zero or nearly to zero, so that it is then possible to shift the control parts into the desired position. Preferably the locking members are guided on the slidable control parts and are provided with fly weights. There are specially shaped parts on the locking members fitting into respective gaps or grooves formed in the shafts on which the control parts are slidably mounted.

A constructional example of the invention is shown in the drawing, in which

Fig. 1 represents by way of example a change speed gear of an automobile together with a main clutch 11 (motor clutch) and a free wheel clutch 12. The figure is a side elevation, but some parts appear in vertical section. The gear box 10 is partly broken away to show a slidable control part 1 adapted for engagement or disengagement with a counter part 9.

Fig. 2 shows this slidable control part together with two locking members in longitudinal section taken on line II—II of Fig. 3.

Fig. 3 is an elevation of the device in which the control part is shown in one of its terminal positions.

Figs. 4 and 5 show in a longitudinal section and in a corresponding front elevation the control part in unlocked position while being shifted in the direction of the arrow (Fig. 4).

1 is the control part slidably mounted on a shaft 2 by means of splines 2'. The control part 1 which may be a gear or a coupling half or the like, has an annular groove 1' into which extends the shifting fork 3. Locking elements 4 provided with fly weights 5 are loosely fastened to the front face of member 1 by means of screw bolts 6 which penetrate through corresponding slots 7 allowing for radial displacement of the locking elements. Both locking members are disposed diametrically opposite to each other and are adapted to engage with gaps or grooves formed in the splines 2'. The side faces of the locking members and the side faces of the said grooves, respectively, are inclined in such a manner that the inclination is greater than the angle of friction concerned.

The weight of the fly weights may be so chosen that the control part 1 may be easily shifted at a certain pre-determined limit in speed of rotation.

Normally, i. e., when the shaft turns with a proper speed for transmitting motion the locking members 4 remain by action of centrifugal force in engagement with the shaft 2 (viz. Figs. 2 and 3) and member 1 is locked against axial displacement. But when the change speed gear is declutched from the motor and is also declutched from the driven shaft leading to the vehicle wheels, and when the speed of rotation of the transmitting parts in the change speed gear decreases considerably or reaches zero, it is possible by axial pressure on the part to be shifted to lift the bevelled locking members 4 out of the gaps or grooves of the shaft and to then effect the definite shifting for connecting or disconnecting the control part 1 to or from the other part 9, respectively.

I do not want to be limited to the details described or shown in the drawing as many variations will occur to those skilled in the art.

What I claim is:—

1. In a change speed gear for motor vehicles a device of the type comprising: a rotatable shaft, a member splined to said shaft, means for shifting said member longitudinally of said shaft from its left hand end position into its right hand end position and vice versa, said member at one end being provided with a substantially plane surface substantially at right angles to the axis of said shaft, two flat elements abutting said plane surface of said shiftable member, said elements being provided with slots, bolts fastened to said member on its plane surface and extending through said slots, each of said elements being provided with an arm extending around said shaft and having a rounded projection adapted to cooperate with adequate recesses in said shaft situated at the end positions of said member, respectively.

2. In a change speed gear for motor vehicles in combination: a rotatable shaft, a member splined to said shaft, means for sifting said member longitudinally of said shaft, said member having two end positions on said shaft, fly weights loosely fastened to said member and having projecting portions adapted to cooperate with adequate recesses in said shaft at the end positions of said member, respectively, said fly weights being of flat shape and comprising each: a weight portion situated at one side of said shaft, and an arm with said projection, said projection being situated substantially on the opposite side of said shaft.

ALBERT MAIER.